United States Patent
Prema Thasarathan et al.

(10) Patent No.: US 12,513,090 B2
(45) Date of Patent: Dec. 30, 2025

(54) TIMESTAMP SMOOTHING TO REMOVE JITTER

(71) Applicant: Dolby Laboratories Licensing Corporation, San Francisco, CA (US)

(72) Inventors: Shanush Prema Thasarathan, North Paramatta (AU); Ning Wang, Epping (AU); Senaka Chandranath Samarasekera, Baulkham Hills (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 364 days.

(21) Appl. No.: 18/252,998

(22) PCT Filed: Nov. 17, 2021

(86) PCT No.: PCT/US2021/059637
§ 371 (c)(1),
(2) Date: May 15, 2023

(87) PCT Pub. No.: WO2022/108979
PCT Pub. Date: May 27, 2022

(65) Prior Publication Data
US 2023/0421507 A1 Dec. 28, 2023

Related U.S. Application Data

(60) Provisional application No. 63/169,599, filed on Apr. 1, 2021, provisional application No. 63/114,577, filed on Nov. 17, 2020.

(51) Int. Cl.
*H04L 47/283* (2022.01)
*H04L 41/147* (2022.01)
*H04L 43/106* (2022.01)

(52) U.S. Cl.
CPC .......... *H04L 47/283* (2013.01); *H04L 41/147* (2013.01); *H04L 43/106* (2013.01)

(58) Field of Classification Search
CPC ... H04L 47/283; H04L 41/147; H04L 43/106; H04L 43/022; H04L 43/16; H04L 41/149; H04L 43/087; H04J 3/0632
See application file for complete search history.

(56) References Cited

U.S. PATENT DOCUMENTS 7,173,945 B1    2/2007  Liu
9,571,376 B2    2/2017  Swartzentruber
(Continued)

FOREIGN PATENT DOCUMENTS

EP      3328010 B1 *  12/2018  ............ H04J 3/0664
WO      2020072770 A1   4/2020

OTHER PUBLICATIONS

O. Hodson, C. Perkins and V. Hardman, "Skew detection and compensation for Internet audio applications," 2000 IEEE International Conference on Multimedia and Expo. ICME2000. Proceedings. Latest Advances in the Fast Changing World of Multimedia (Cat. No. 00TH8532), New York, NY, USA, 2000, pp. 1687-1690 vol. 3, doi: 10.1109/ICME.2000.871096, 4 pages.
(Continued)

*Primary Examiner* — Habte Mered (57) ABSTRACT

Embodiments are disclosed for timestamp smoothing to remove jitter. In some embodiments, a method of smoothing timestamps associated with audio packets comprises: receiving, using at least one processor, a series of input timestamps for audio packets and their respective packet lengths; estimating, using the at least one processor, an initial timestamp based on the series of input timestamps, the packet lengths and a sample time; calculating, using the at least one processor, a predicted timestamp based on the estimated
(Continued)

initial timestamp; and smoothing, using the at least one processor, the predicted timestamp.

14 Claims, 4 Drawing Sheets

(56) References Cited

U.S. PATENT DOCUMENTS

| | | |
|---|---|---|
| 10,013,229 B2 | 7/2018 | Doerbecker |
| 10,069,741 B2 | 9/2018 | Mendez |
| 10,142,088 B2 | 11/2018 | Liu |
| 10,616,123 B2 | 4/2020 | Wang |
| 10,701,124 B1 | 6/2020 | Srinivasan |
| 2008/0008096 A1* | 1/2008 | Dhanapal ............. H04J 3/0632 370/428 |
| 2008/0270800 A1* | 10/2008 | Krober ................. H04J 3/1688 713/178 |
| 2020/0186584 A1* | 6/2020 | Srinivasan ............. H04L 65/80 |
| 2020/0205100 A1 | 6/2020 | Boehlke |
| 2020/0252152 A1 | 8/2020 | Hansson |
| 2020/0321014 A1 | 10/2020 | Reuschl |
| 2020/0322649 A1 | 10/2020 | Melkote Krishnaprasad |
| 2020/0358907 A1 | 11/2020 | Liu |
| 2020/0382361 A1* | 12/2020 | Chandrasekhar ........ G06N 5/01 |

OTHER PUBLICATIONS

Puttnies et al., "Estimators for Time Synchronization—Survey, Analysis, and Outlook" IoT 2020, 1, 398-38; doi: 10.3390/iot1020023, Nov. 17, 2020, 38 pages.

* cited by examiner

TIMESTAMP SMOOTHING TO REMOVE JITTER

CROSS-REFERENCE TO RELATED APPLICATIONS

This application is a U.S. National Stage application under U.S.C. 371 of International Application No. PCT/US2021/059637, filed on Nov. 17, 2021, which claims the benefit of priority to U.S. Provisional Patent Application No. 63/169,599, filed on Apr. 1, 2021, and U.S. Provisional Patent Application No. 63/114,577, filed on Nov. 17, 2020, all of which are hereby incorporated by reference in their entirety.

TECHNICAL FIELD

This disclosure relates generally to audio signal processing.

BACKGROUND

A real-time audio processing system will typically receive audio in packets or blocks. For some audio processing systems, time information (hereinafter, "timestamps") is associated with each packet that indicates when the audio was captured or played out of the audio processing system. This time information may be used by the audio processing system for a variety of applications, including but not limited to: latency estimation, audio alignment, discontinuity detection, detection of latency changes or misalignment and echo cancellation, suppression and management. On some audio processing systems however, the timestamps may be unreliable. For example, timestamps may be unstable or inaccurate for a short period of tune, resulting in jitter or oscillations in the audio due to conversion of the timestamp from one clock domain to another clock domain (e.g., between a true audio clock and a system clock). When timestamps are unreliable the algorithms that rely on the timestamps may perform false detections, incorrect calculations or other undesirable results. For example, latency estimation may become unstable or inaccurate for a short period of time or discontinuity detection may falsely be triggered.

SUMMARY

Implementations are disclosed for timestamp smoothing to remove jitter.

In some embodiments, a method of smoothing timestamps associated with audio packets comprises: receiving, using at least one processor, a series of input timestamps for audio packets and their respective packet lengths; estimating, using the at least one processor, an initial timestamp based on the series of input timestamps, the packet lengths and a sample time; calculating, using the at least one processor, a predicted timestamp based on the estimated initial timestamp; and smoothing, using the at least one processor, the predicted timestamp.

In some embodiments, the method further comprises: processing, using the at least one processor, audio data in a current audio packet based on the smoothed predicted timestamp.

In some embodiments, estimating an initial timestamp further comprises: calculating, iteratively, an estimated initial timestamp based on the series of input timestamps, their respective packet lengths, the sample time and an initial time in which a current instability in the series of input timestamps is detected; storing each estimated initial timestamp in a rolling history array of length $N_s$; sorting the rolling history array; determining a new estimate of the initial timestamp based on the sorted rolling history array; calculating a mean and variance of the new estimated initial timestamp; determining whether a future predicted timestamp will be stable based on the variance; stopping the iterative calculating if future prediction timestamp is determined to be stable; and setting the estimated initial timestamp to a last value of the mean prior to stopping the iterative calculating.

In some embodiments, the length N s is chosen as a compromise between latency and an amount of smoothness of the current timestamp.

In some embodiments, the mean and variance are smoothed.

In some embodiments, determining whether a future predicted timestamp will be accurate and stable based on the variance, further comprises: determining that a current variance is less than a previous variance and the current variance is also less than a parameter lined by a variance of an audio clock used to process the audio packets.

In some embodiments, the iterative calculating resumes in response to a detection of a possible discontinuity in the predicted timestamp.

In some embodiments, a possible discontinuity is detected based on an estimated clock skew between clocks of communication end points or between a virtual nominal clock and a true hardware clock, a clock skew corrected difference between the predicted timestamp and the input timestamp, and a corrected block length of the clock skew.

In some embodiments, the method further comprises: tracking a number of times that a possible discontinuity has occurred; and determining that a discontinuity has occurred if the number of times exceeds a specified threshold.

In some embodiments, the tracking a number of times that a possible discontinuity has occurred, further comprises: incrementing a counter after each discontinuity is detected; and resetting the counter when the clock skew corrected difference between the predicted timestamp and the input timestamp is greater than a factor times the clock skew corrected block length.

In some embodiments, the method further comprises: determining whether the predicted timestamp is stable; determining whether a possible discontinuity in the predicted timestamp is detected; and in accordance with the predicted time stamp being stable and no possible discontinuity being detected, estimating the clock skew.

In some embodiments, the estimated clock skew is calculated by: computing an initial estimate of clock skew; computing an estimated mean and variance of the initial estimate of clock skew; comparing the variance to a threshold variance; in accordance with the variance being less than the threshold variance, smoothing the initial estimate of clock skew to obtain the estimated clock skew.

In some embodiments, the method comprises: correcting the predicted timestamp based on the estimated clock skew to obtain the smoothed timestamp.

In some embodiments, a system comprises one or more processors and a computer-readable medium storing instructions that when executed by the one or more processors causes the one or more processors to perform any of the preceding methods.

In some embodiments, a non-transitory computer-readable medium storing instructions that, when executed by one or more processors, cause the one or more processors to perform any of the preceding methods.

Other implementations disclosed herein are directed to a system, apparatus and computer-readable medium. The details of the disclosed implementations are set forth in the accompanying drawings and the description below. Other features, objects and advantages are apparent from the description, drawings and claims.

Particular implementations disclosed herein provide one or more of the following advantages. The disclosed embodiments take as input a timestamp associated with a current audio packet and a packet length in units of time. From this information, the disclosed embodiments estimate a timestamp (hereinafter al so referred to as "timestamp smoothing"), and generate flags that indicate whether the estimated timestamp is stable and whether a discontinuity in the timestamp was detected. Additionally, the disclosed embodiments are adaptive which allow for improved timestamp estimation over time.

DESCRIPTION OF DRAWINGS

In the drawings, specific arrangements or orderings of schematic elements, such as those representing devices, units, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some implementations.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths, as may be needed, to affect the communication.

The same reference symbol used in various drawings indicates like elements.

DETAILED DESCRIPTION

In the following detailed description, numerous specific details are set forth to provide a thorough understanding of the various described embodiments. It will be apparent to one of ordinary skill in the art that the various described implementations may be practiced without these specific details. In other instances, well-known methods, procedures, components, and circuits, have not been described in detail so as not to unnecessarily obscure aspects of the embodiments. Several features are described hereafter that can each be used independently of one another or with any combination of other features.

Nomenclature

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." The terms "determined," "determines," or "determining" are to be read as obtaining, receiving, computing, calculating, estimating, predicting or deriving. In addition, in the following description and claims, unless defined otherwise, all technical and scientific terms used herein have the same meaning as commonly understood by one of ordinary skills in the art to which this disclosure belongs.

General Overview

Figure 1:
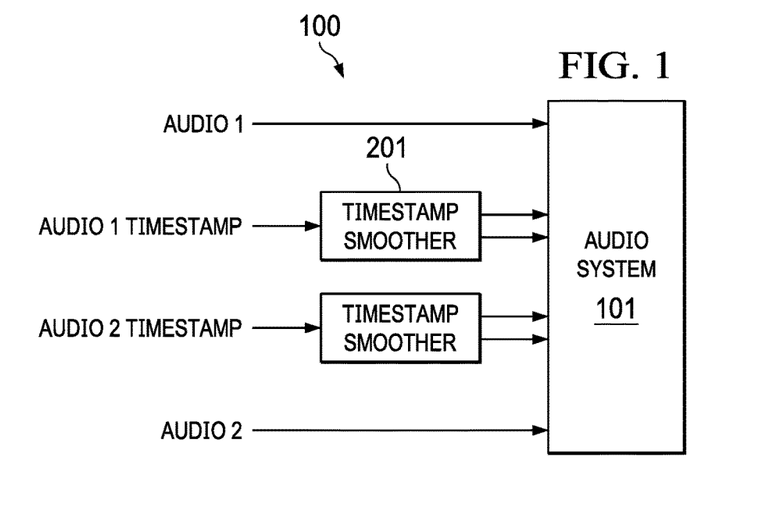
FIG. 1 is a block diagram of a system incorporating timestamp smoothing units, according to some embodiments.

FIG. 1 is a block diagram of a system 100 including audio processing system 101 and timestamp smoothing unit 201, according to some embodiments. Audio processing system 101 can be any real-time audio processing system. When real-time audio packets are received sequentially in time, each packet is associated with a timestamp that is extracted from the packet or from a separate metadata transport stream, and input into timestamp smoothing unit 201. Timestamp smoothing unit 201 is configured to estimate/smooth a timestamp that is more accurate than the raw timestamp received, as described in further detail in reference to FIG. 2.

Example Timestamp Smoothing Process

Figure 2:
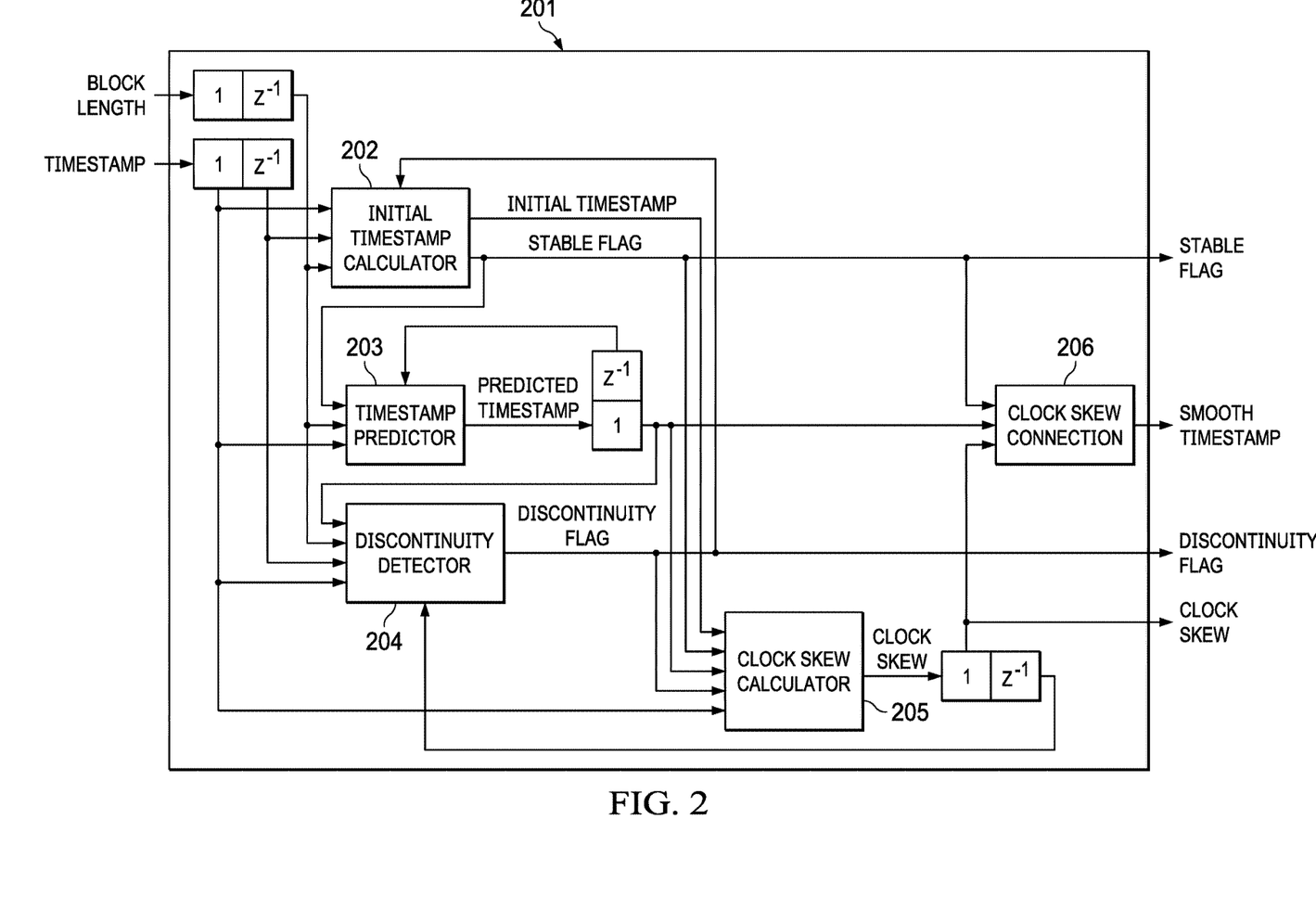
FIG. 2 is a block diagram of a timestamp smoothing unit, according to some embodiments.

FIG. 2 is a block diagram of timestamp smoothing unit 201 shown in in FIG. 1. Timestamp smoothing unit 101 includes initial timestamp calculator unit 202, timestamp predictor unit 203, discontinuity detector unit 204, clock skew calculator unit 205 and clock skew correction unit 206. The timestamp smoothing process shown in FIG. 2 is adaptive and thus the smoothed timestamp it provides improves over time. Note that the notation $[1, z^{-1}]$ in FIG. 2 conveys that the current output of a particular unit will be used in a next iteration of the timestamp smoothing process. For example, the current output of the time predictor unit 203 will be used in the next iteration of the time predictor unit 203, and the current output of clock skew calculator unit 205 will be used in the next iteration of discontinuity detector unit 204.

Referring to the left of FIG. 2, the raw timestamp and packet length are input into initial timestamp calculation unit 201. Initial timestamp calculator unit 202 computes an initial estimate of the first input timestamp. In an embodiment, the initial estimate is calculated iteratively using Equation [1]:

$$t_i(n)=t(n)-\Sigma_{k=\phi}^{n-1}b(k)\cdot T_s,\qquad [1]$$

where $t_i$ is the estimated initial timestamp, t is the raw timestamp, b(k) is the length of the audio packet, n is a time index, $T_s$ is the sample time and $\phi$ is the initial time in which a current instability has started.

Initial timestamp calculator unit 202 stores the estimated initial time step $t_i$ into a rolling history array H(n, x) with length $N_s$ such that $$H(n,k)=t_i(n-k-1) \text{ for } 1<k<N_s.\qquad [2]$$

Initial timestamp calculator unit 202 computes a sorted version of the history array H (n, 1 ... $N_s$) which is denoted as $H_s(n,x)$. From $H_s(n,x)$ the initial timestamp calculator unit 202 determines a new estimate for the initial timestamp, $t_{i_a}$, using Equation [3]:

$$t_{i_a}(n) = \sum_{k>\lfloor\frac{M}{2}\rfloor}^{\lfloor\frac{M}{2}\rfloor} \frac{1}{2}\cdot H_s\left(n, \left\lfloor\frac{N_s}{2}\right\rfloor - k\right),\qquad [3]$$

where $N_s$ (e.g., $N_s$=4) is the length of $H_s$(n, x) and $H_s$(n,x), and $N_s$ is chosen through a compromise between latency and smoothness of the output, and M is in integer value that is much less than N s (e.g., M=2). The value of $t_{i_a}$(n) is erroneous until (n−$\phi$)>$N_s$. After this point in time, initial timestamp calculation unit 202 calculates mean and variance estimates as follows:

$$I_m(n)=t_i(n) \text{ and } I_v(n)=0 \text{ for } (n-\phi)<N_s;\qquad [4]$$

otherwise, $$I_m(n)=\alpha_1\cdot t_{i_a}(n)+(1-\alpha_1)\cdot I_m(n-1)\qquad [5]$$

$$I_{v_{inst}}(n)|t_{i_a}(n)-I_m(n)|^2,\qquad [6]$$

$$I_v(n)=\beta_1\cdot I_{v_{inst}}(n)+(1-\beta_1)\cdot I_v(n),\qquad [7]$$

where:
$I_m$ is the estimated mean of the initial time stamp,
$I_{v_{inst}}$ is the instantaneous estimated variance of the initial timestamp,
$I_v$ is the estimated variance of the initial timestamp, and
$\alpha_1$, $\beta_1$ are smoothing parameters, tuned through experiment (e.g., $\alpha_1$=0.2 and $\beta_1$=0.05).

From Equations [4]-[7], initial timestamp calculator unit 202 determines both the initial estimated timestamp and whether the initial estimated timestamp is stable by testing for the following conditions:

$$I_v(n)<I_v(n-1),\qquad [8]$$

$$I_v(n)<I_{v_{typical}},\qquad [9]$$

where $I_{v_{typical}}$ is a tuning parameter.

In some embodiments, the value of $I_{v_{typical}}$ is determined by analyzing the variance of the particular system receiving the timestamps and also considering the fact that the initial timestamp estimation will vary by the typical imprecision of the true audio clock. In some cases, $I_{v_{typical}}$=80 ms$^2$.

When the conditions described by Equations [8] and [9] are true, the initial estimated timestamp is considered stable and a stable flag is generated indicating its stable status, A stable estimated timestamp means that the estimated timestamp is stable at this very point in time and that future predictions of timestamps are accurate and stable. Stability is denoted herein by the variable S, where S is set to 1 when the estimated timestamp is stable. The initial estimated timestamp is equal to $I_m$(n) at this point in time, which is denoted as $t_{if}$. Once the initial estimated timestamp is stable, initial timestamp calculator unit 201 stops iterating until a reset occurs. In some embodiments, a reset occurs when discontinuity detector unit 204 determines that a discontinuity in the estimated timestamp has occurred, in which case $\phi$ is set to that point in time where the discontinuity occurred, S is set to 0 and initial timestamp calculator unit 202 starts iterating.

After the initial estimated timestamp is determined, timestamp predictor unit 203 generates a prediction of the current estimated timestamp, Timestamp predictor unit 203 performs different calculations based on whether the estimated timestamp is stable by initial timestamp calculator unit 202, which occurs when the conditions of Equation are met:

$$t_p(n) = \begin{cases} t(n), S = 0 \\ t_p(n-1) + b(n-1)\cdot T_s, S = 1 \end{cases}.\qquad [10]$$

After the timestamp prediction, the discontinuity detector unit 204 determines if a discontinuity in the estimated timestamp occurred. A few quantities are first computed:

$$d_1(n)=|t_p(n)-t(n)+(t_p(n)-t_{if})\cdot c(n-1)|,\qquad [11]$$

$$b_c(n)=b(n)\cdot(1+c(n-1)).\qquad [12]$$

where:
c is the clock skew calculated by clock skew calculator unit 205,
$d_1$ is the clock skew corrected difference between predicted timestamp and raw timestamp, and
$b_c$ is the clock skew corrected block length.

Discontinuity detection unit 204 tracks the number of times that the discontinuity detector unit 204 detects a possible discontinuity in the estimated timestamp. In an embodiment, discontinuity detector unit 204 initializes a counter with the value of 1 at the first instance that the following condition is true:

$$d_1(n)>DF\cdot b_c(n),\qquad [13]$$

where DF is a tuning parameter determined by experimentation (e.g., DF=0.9). As soon as discontinuity detector unit 204 determines that the condition in Equation is not true, the counter is reset to 0. If the condition specified in Equation is true and the counter is greater than or equal to 1, discontinuity detector unit 204 computes the following:

$$d_2(n)=|(t(n-1)+b(n-1))-t(n)|,\qquad [14]$$

$$d_2(n)>DF\cdot b_c(n),\qquad [15]$$

If the condition specified in Equation is true, then the counter is reset to zero. Otherwise the counter is incremented by one. Once the counter reaches a tunable threshold, discontinuity detector unit 204 reports that a discontinuity has occurred to initial timestamp calculator unit 202 and to the particular audio processing system receiving the audio packets. From experimentation, once the counter has reached 5, a discontinuity in the estimated timestamp has definitely occurred. When the estimated timestamp is stable and no possible discontinuity in the estimated timestamp is detected, a clock skew calculation is undertaken by clock skew calculator unit 204.

In some embodiments, an initial estimate of clock skew is calculated using Equation:

$$c_e(n) = \frac{t(n) - t_p(n)}{t_p(n) - t_{i_f}}. \quad [16]$$

Clock skew calculator unit 205 computes an estimate of the mean and variance modified by a heuristic on the actual $\alpha_2$ and $\beta_2$ values used:

$$c_m(n) = (1 - \alpha_2(n)) \cdot c_m(n-1) + \alpha_2(n) \cdot c_e(n), \quad [17]$$

$$c_{v_{inst}}(n) = |c_e(n) - c_m(n-1)|^2, \quad [18]$$

$$c_v(n) = (1 - \beta_2(n)) \cdot c_v(n-1) + \beta_2 \cdot v_{v_{inst}}(n), \quad [19]$$

$$vf(n) = \frac{c_{v_{inst}}(n)}{c_v(n-1) + \epsilon}, \quad [20]$$

$$\alpha_2(n) = \begin{cases} A_1, & vf(n) < X \\ A_2, & vf(n) \geq X \end{cases}, \quad [21]$$

$$\beta_2(n) = \begin{cases} B_1, & vf(n) < X \\ B_2, & vf(n) \geq X \end{cases}, \quad [22]$$

where:
- $c_m$ is the estimated mean of the initial clock skew estimate,
- $c_{v_{inst}}$ is the instantaneous estimated variance of the initial clock skew estimate,
- $c_v$ is the estimated variance of the initial clock skew estimate,
- vf is the "variance factor", tag used to determine the values for $\alpha_2$ and $\beta_2$,
- $\alpha_2$ factor used in estimating the mean,
- $\beta_2$ factor used in estimating variance,
- $A_1, A_2, B_1, B_2$ tuning parameters, where $A_1$ is expected to be bigger than $A_2$ and $B_1$ is expected to be bigger than $B_2$ (e.g., $A_1$=0.25, $A_2$=0.025, $B_1$=0.001, $B_2$=0.0001), and X is a tuning parameter (e.g., X=20).

In some embodiments, to determine the final estimate of the clock skew, clock skew calculator unit 205 smoothes the estimated clock skew only if the variance is small. That is when:

$$c(0) = 0 \quad [23]$$

$$c(n) = \begin{cases} \dfrac{c\_e(n) + (\gamma - 1) \cdot c(n-1)}{\gamma}, & c\_v(n) < Y \\ c(n-1), & c\_v(n) \geq Y \end{cases},$$

where $\gamma$ and Y are tuning parameters determined by experimentation (e.g., $\gamma$=100 and Y=1e$^{-11}$).

Using a current estimate of clock skew, clock skew correction unit 206 corrects the predicted timestamp computed by timestamp predictor unit 203. Hence, the final smooth estimated timestamp provided as an output of timestamp smoothing unit 101 is given by $t_s(n)$:

$$t_s(n) = t_p(n) + (t_p(n) - t_{i_f}) \cdot c(n). \quad [25]$$

Also output of timestamp smoothing unit 101 is a stable flag, a discontinuity flag and clock skew which are provided to the particular audio processing system receiving the audio packets (e.g., system 101 in FIG. 1).

Figure 3:
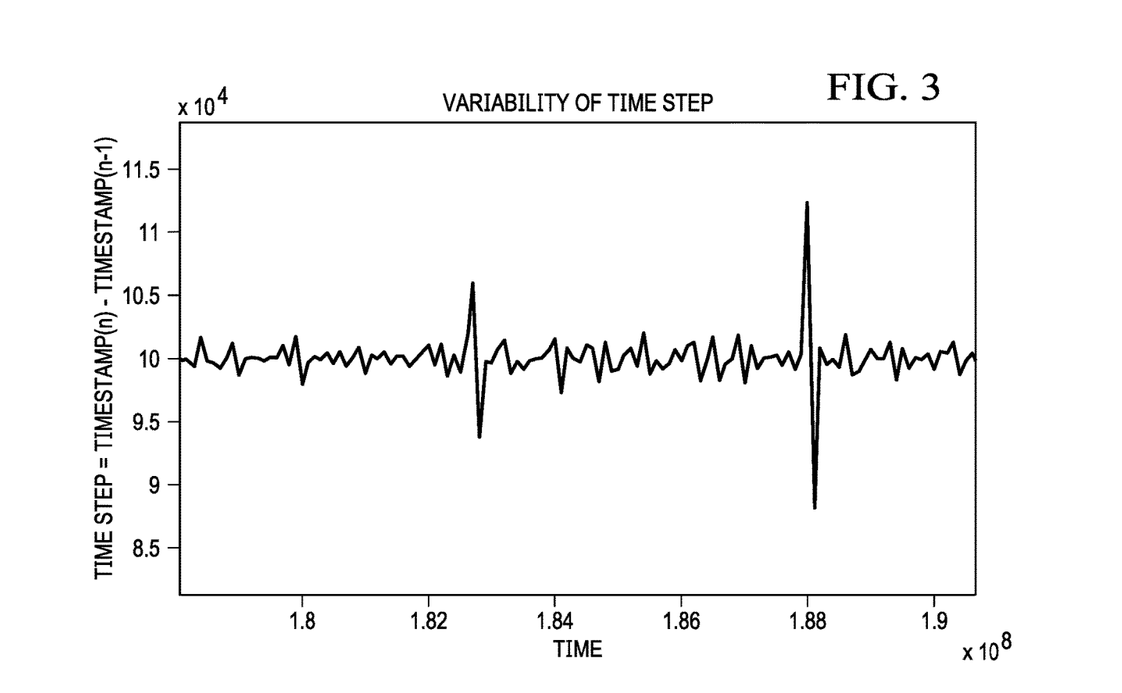
FIG. 3 illustrates variability of timestep, according to some embodiments.

FIG. 3 illustrates variability of packet timestamps, according to some embodiments. The variability is the difference between successive timestamps, i.e., the timestep. The vertical axis is variability in the timestep and the horizontal axis is time. Ideally, the timestep should be a constant value, but in practice the timestep jitters. In the example shown, the time of origin and the point at which the timestamp is computed include a significant and variable delay, which may be depend on computer's workload. This delay is shown in FIG. 3 as a large spike in variability at about 1.88 milliseconds.

Figure 4:
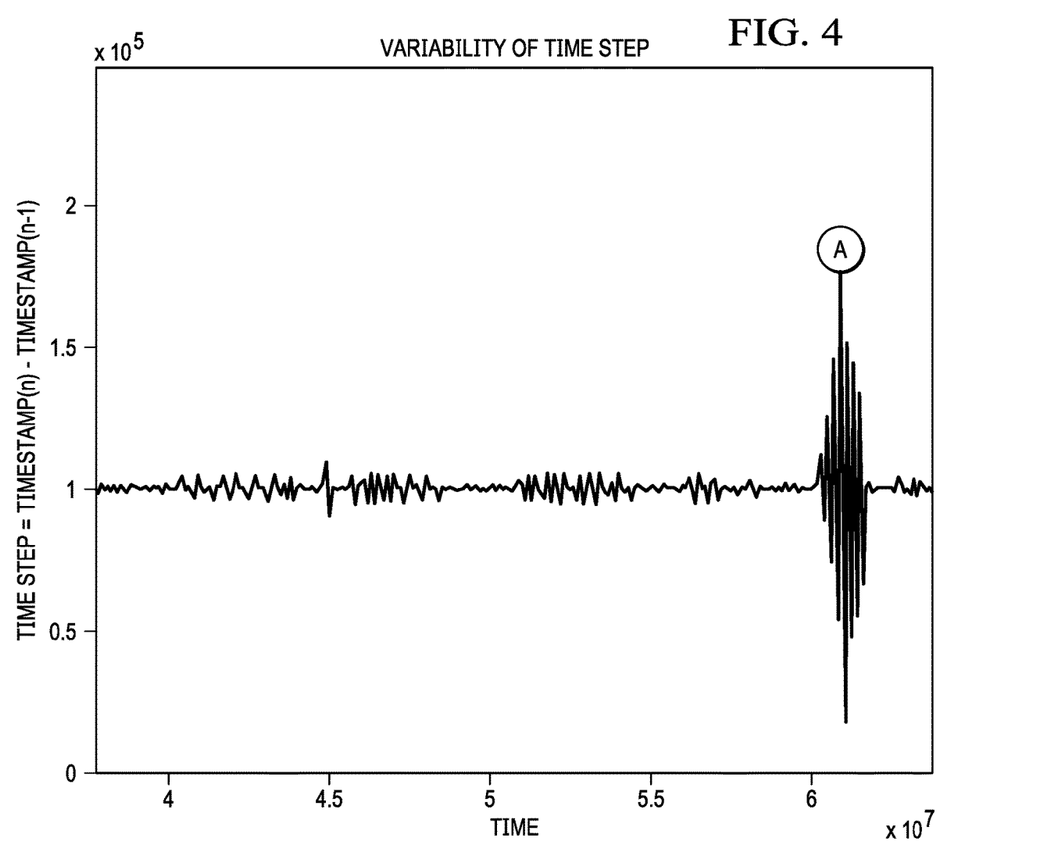
FIG. 4 further illustrates variability of timestep, according to some embodiments.
Figure 5:
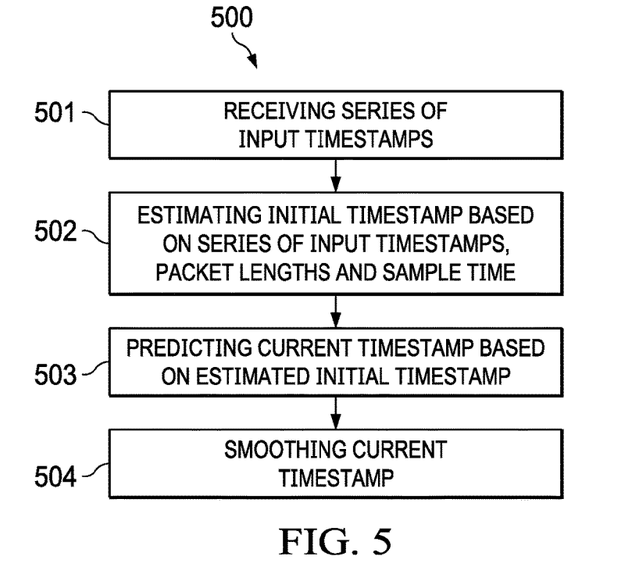
FIG. 5 is a flow diagram or a process of timestamp smoothing, according to some embodiments.

FIG. 4 further illustrates variability of a timestep, according to some embodiments. Note that much bigger spikes occur near the end of the packet transfer (see point A) in contrast to the usual jitter shown in FIG. 3. In most systems, some basic assumptions to estimate a smoothed timestamp hold. These assumptions are that each audio packet is received sequentially in time, and general trends provided by analyzing the timestamp history can be relied upon. However, the first timestamp might have excessive error, which makes it unsuitable to use as an initial time stamp to start timestamp estimation. For example, if t(0) in Equation [1] was set to the timestamp associated with point A in FIG. 4, the $t_p(n)$ will have a bias for all n. This issue was address by initial timestamp calculator 202, as described above. Also, packets maybe lost in between. In this case the rolling history array in Equation [2] will not be valid. This problem is addressed by discontinuity detector unit 204, as described above. Also, a system might be configured for a nominal sampling time, $T_s$, but the actual $T_s$ may differ. In this case, an estimation of the ideal timestep would have an offset to the timestep computed from the nominal T s (i.e., clock skew). This problem is addressed by the clock skew calculator unit 205 and clock skew correction unit 206, as described above Example Process FIG. 5 is a flow diagram of a process 500, according to some embodiments. Process 400 can be implemented using system 600 shown in FIG. 6, Process 500 comprises receiving a series of input timestamps for audio packets and their respective packet lengths (501), estimating an initial timestamp based on the series of input timestamps, the packet lengths and a sample time (502), predicting a current timestamp based on the estimated initial timestamp (503) and smoothing the current timestamp (504).

Example System Architecture

Figure 6:
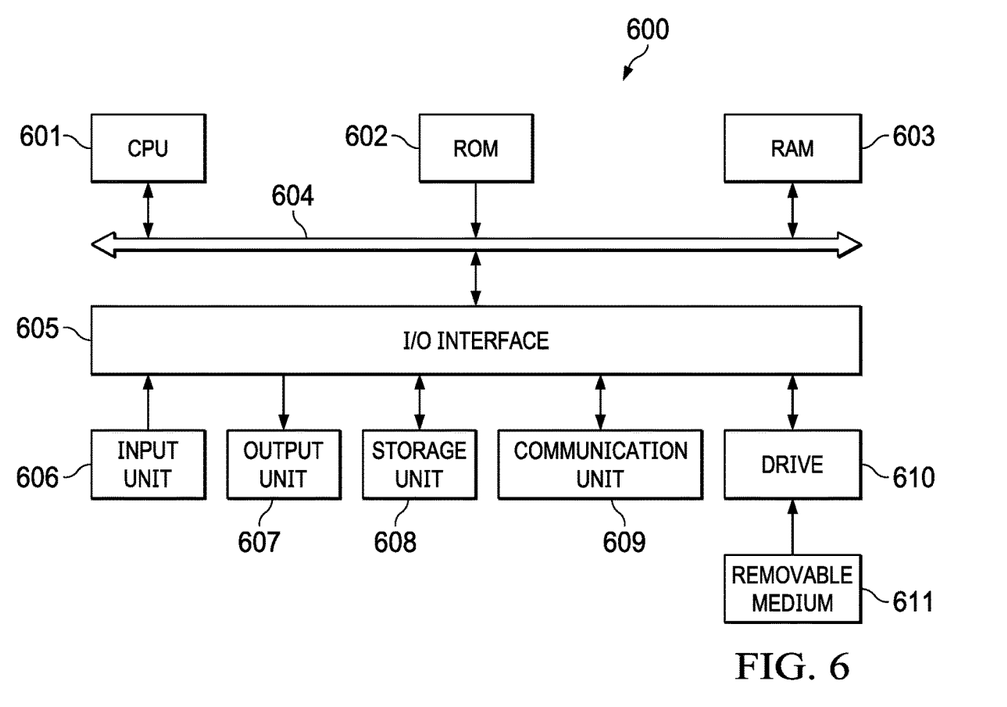
FIG. 6 is a block diagram of a system for implementing the features and processes described in reference to FIGS. 1-5, according to some embodiments.

FIG. 6 shows a block diagram of an example system for implementing the features and processes described in reference to FIGS. 1-5, according to an embodiment. System 600 includes any devices that are capable of playing audio, including but not limited to: smart phones, tablet computers, wearable computers, vehicle computers, game consoles, surround systems, kiosks.

As shown, the system 600 includes a central processing unit (CPU) 601 which is capable of performing various processes in accordance with a program stored in, for example, a read only memory (ROM) 602 or a program loaded from, for example, a storage unit 608 to a random access memory (RAM) 603. In the RAM 603, the data required when the CPU 601 performs the various processes is also stored, as required. The CPU 601, the ROM 602 and the RAM 603 are connected to one another via a bus 609. An input/output (110) interface 605 is also connected to the bus 604.

The following components are connected to the I/O interface 605: an input unit 606, that may include a keyboard, a mouse, or the like; an output unit 607 that may include a display such as a liquid crystal display (LCD) and one or more speakers; the storage unit 608 including a hard disk, or another suitable storage device; and a communication unit 609 including a network interface card such as a network card (e.g., wired or wireless).

In some implementations, the input unit 606 includes one or more microphones in different positions (depending on the host device) enabling capture of audio signals in various formats (e.g., mono, stereo, spatial, immersive, and other suitable formats).

In some implementations, the output unit 607 include systems with various number of speakers. As illustrated in FIG. 6, the output unit 607 (depending on the capabilities of the host device) can render audio signals in various formats (e.g., mono, stereo, immersive, binaural, and other suitable formats).

The communication unit 609 is configured to communicate with other devices (e.g., via a network). A drive 610 is also connected to the I/O interface 605, as required. A removable medium 611, such as a magnetic disk, an optical disk, a magneto-optical disk, a flash drive or another suitable removable medium is mounted on the drive 610, so that a computer program read therefrom is installed into the storage unit 608, as required. A person skilled in the art would understand that although the system 600 is described as including the above-described components, in real applications, it is possible to add, remove, and/or replace some of these components and all these modifications or alteration all fall within the scope of the present disclosure.

In accordance with example embodiments of the present disclosure, the processes described above may be implemented as computer software programs or on a computer-readable storage medium. For example, embodiments of the present disclosure include a computer program product including a computer program tangibly embodied on a machine readable medium, the computer program including program code for performing methods. In such embodiments, the computer program may be downloaded and mounted from the network via the communication unit 609, and/or installed from the removable medium 611, as shown in FIG. 6.

ENUMERATED EXAMPLE EMBODIMENTS (EEES)

EEE1—An audio processor configured to provide a smoothed accurate timestamp estimation for audio frames, which is not sensitive to jittering caused by jittering on a communication link or software/hardware process scheduling.

EEE2—An audio processor of EEE1 that calculates and corrects for clock skew between two clocks of communication end points, or between a virtual nominal clock and a true hardware clock.

EEE3—An audio processor of EEE2 that calculates clock skew by computing a smoothed gradient between an initial timestamp and a current raw timestamp, where smoothing occurs only when an instantaneous gradient is deemed to be reliable.

EEE4—An audio processor of EEE1 that detects and accounts for discontinuity in the audio.

EEE5—An audio processor of EEE4 that detects discontinuity when a delta between a predicted and an estimated timestamp (taking into account clock skew) is sufficiently large for a given period of time.

EEE6—An audio processor of EEE1 that identifies stability in incoming audio packets.

EEE7—An audio processor of EEE6 that determines an estimate initial timestamp by using a trimmed mean filter on a rolling history and identifying stability based on thresholding the variance of the initial timestamp estimations.

EEE8—An audio processor that combines EEE2, EEE4 and EEE6.

EEE9—An audio processor of EEE8 that uses the methods as per EEE3, EEE5 and EEE7.

EEE10—A system where a discontinuity flag output of a module be used by the system (be informed and take action based on this information)

EEE11—A system where a stability flag output of the module can be used by the system (be informed and take action based on this information)

EEE12—A system where the clock skew (and confidence on the accuracy of the clock skew) output of the module can be used by the system (be informed and take action based on this information).

Generally, various example embodiments of the present disclosure may be implemented in hardware or special purpose circuits (e.g., control circuitry), software, logic or any combination thereof. For example, the units discussed above can be executed by control circuitry (e.g., a CPU in combination with other components of FIG. 6), thus, the control circuitry may be performing the actions described in this disclosure. Some aspects may be implemented in hardware, while other aspects may be implemented in firmware or software which may be executed by a controller, microprocessor or other computing device (e.g., control circuitry). While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product including a computer program tangibly embodied on a machine readable medium, the computer program containing program codes configured to carry out the methods as described above.

In the context of the disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may be non-transitory and may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus that has control circuitry, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed over one or more remote computers and/or servers.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of smoothing timestamps associated with audio packets, the method comprising:
   receiving, using at least one processor, a series of input timestamps for audio packets and their respective packet lengths;
   estimating, using the at least one processor, an initial timestamp based on the series of input timestamps, the packet lengths and a sample time, wherein estimating the initial timestamp comprises:
      calculating, iteratively, an estimated initial timestamp based on the series of input timestamps, their respective packet lengths, the sample time and an initial time in which a current instability in the series of input timestamps is detected;
      storing each estimated initial timestamp in a rolling history array of length Ns;
      sorting the rolling history array;
      determining a new estimate of the initial timestamp based on the sorted rolling history array;
      calculating a mean and variance of the new estimated initial timestamp;
      determining whether a future predicted timestamp will be stable based on the variance;
      stopping the iterative calculating if the future predicted timestamp is determined to be stable; and
      setting the estimated initial timestamp to a last value of the mean prior to stopping the iterative calculating;
   calculating, using the at least one processor, a predicted timestamp based on the estimated initial timestamp; and
   smoothing, using the at least one processor, the predicted timestamp.

2. The method of claim 1, further comprising:
   processing, using the at least one processor, audio data in a current audio packet based on the smoothed predicted timestamp.

3. The method of claim 1, wherein the length $N_s$ is chosen as a compromise between latency and an amount of smoothness of the current timestamp.

4. The method of claim 1, wherein the mean and variance are smoothed.

5. The method of claim 1, wherein determining whether a future predicted timestamp will be accurate and stable based on the variance, further comprises:
   determining that a current variance is less than a previous variance and the current variance is also less than a parameter determined by a variance of an audio clock used to process the audio packets.

6. The method of claim 1, wherein the iterative calculating resumes in response to a detection of a possible discontinuity in the predicted timestamp.

7. The method of claim 6, wherein a possible discontinuity is detected based on an estimated clock skew between clocks of communication end points or between a virtual nominal clock and a true hardware clock, a clock skew corrected difference between the predicted timestamp and the input timestamp, and a corrected block length of the clock skew.

8. The method of claim 7, further comprising:
   tracking a number of times that a possible discontinuity has occurred; and
   determining that a discontinuity has occurred if the number of times exceeds a specified threshold.

9. The method of claim 8, wherein the tracking a number of times that a possible discontinuity has occurred, further comprises:
   incrementing a counter after each discontinuity is detected; and
   resetting the counter when the clock skew corrected difference between the predicted timestamp and the input timestamp is greater than a factor times the clock skew corrected block length.

10. The method of claim 7, further comprising:
    determining whether the predicted timestamp is stable;
    determining whether a possible discontinuity in the predicted timestamp is detected; and
    in accordance with the predicted time stamp being stable and no possible discontinuity being detected, estimating the clock skew.

11. The method of claim 7, wherein the estimated clock skew is calculated by:
    computing an initial estimate of clock skew;
    computing an estimated mean and variance of the initial estimate of clock skew;
    comparing the variance to a threshold variance;

in accordance with the variance being less than the threshold variance, smoothing the initial estimate of clock skew to obtain the estimated clock skew.

12. The method of claim 7, further comprising:
correcting the predicted timestamp based on the estimated clock skew to obtain the smoothed timestamp.

13. A system comprising:
one or more processors; and
a non-transitory computer-readable medium storing instructions that, when executed by the one or more processors, cause the one or more processors to:
receive a series of input timestamps for audio packets and their respective packet lengths;
estimate an initial timestamp based on the series of input timestamps, the packet lengths and a sample time, wherein estimating the initial timestamp comprises:
calculating, iteratively, an estimated initial timestamp based on the series of input timestamps, their respective packet lengths, the sample time and an initial time in which a current instability in the series of input timestamps is detected;
storing each estimated initial timestamp in a rolling history array of length $N_s$;
sorting the rolling history array;
determining a new estimate of the initial timestamp based on the sorted rolling history array;
calculating a mean and variance of the new estimated initial timestamp;
determining whether a future predicted timestamp will be stable based on the variance;
stopping the iterative calculating if the future predicted timestamp is determined to be stable; and
setting the estimated initial timestamp to a last value of the mean prior to stopping the iterative calculating;
calculate a predicted timestamp based on the estimated initial timestamp; and
smooth the predicted timestamp.

14. A non-transitory computer-readable medium storing instructions that, when executed by one or more processors, cause the one or more processors to perform operations of claim 1.

* * * * *